United States Patent [19]

Hosoi

[11] Patent Number: 5,004,384
[45] Date of Patent: Apr. 2, 1991

[54] DRILL

[76] Inventor: Toshiaki Hosoi, 9-10, Kamiminami 5-chome, Hirano-ku, Osaka-shi, Osaka-fu, Japan

[21] Appl. No.: 319,582

[22] Filed: Mar. 6, 1989

[30] Foreign Application Priority Data

Mar. 11, 1988 [JP] Japan ............................ 63-58974
Apr. 12, 1988 [JP] Japan ............................ 63-89568

[51] Int. Cl.$^5$ ............................................. B23B 51/02
[52] U.S. Cl. ..................................... 408/230; 408/227
[58] Field of Search ...................... 408/227, 229, 230

[56] References Cited

U.S. PATENT DOCUMENTS

| 465,392 | 12/1891 | Shippee | 408/230 |
| 750,537 | 1/1904 | Hanson | 408/230 |
| 1,069,930 | 8/1913 | Down | 408/230 |
| 2,769,355 | 11/1956 | Crisp | 408/230 |
| 2,936,658 | 5/1960 | Riley | 408/230 |
| 4,565,473 | 1/1986 | Hosoi | 408/229 |
| 4,583,888 | 4/1986 | Mori et al. | 408/230 |
| 4,605,347 | 8/1986 | Jodock et al. | 408/230 |

FOREIGN PATENT DOCUMENTS

| 177214 | 10/1983 | Japan | 408/230 |
| 177807 | 9/1985 | Japan | 408/230 |
| 178110 | 8/1986 | Japan | 408/230 |

Primary Examiner—Daniel W. Howell
Attorney, Agent, or Firm—Jordan and Hamburg

[57] ABSTRACT

A drill having a shank formed with helical or straight flutes for discharging chips therethrough and a pair of cutting edges formed at one end of the shank and extending continuously from the center of rotation of the drill to the periphery thereof. Each of the flutes is defined by a wall which is positioned rearward with respect to the direction of rotation of the drill and against which a flat plate portion of the chip formed by the portion of the cutting edge on the peripheral side is to be pressed, and by a wall positioned forward with respect to the direction for a side edge portion of the chip to come into contact with. The forward wall is inclined with respect to the rearward wall so as to prevent the chip from curling in its entirety. The drill is given improved rigidity and adapted to discharge chips as broken into fragments of suitable length.

5 Claims, 6 Drawing Sheets

DRILL

BACKGROUND OF THE INVENTION AND RELATED ART STATEMENT

The present invention relates to drills suitable for deep hole drilling and having helical or straight flutes formed in the shank for discharging chips therethrough.

Generally, drills are formed with helical flutes in the shank for discharging chips. The chips are curled while moving through the flutes and are discharged in the form of conical helical chips. Such discharged chips revolve with the rotation of the drill, wind around neighboring portions of the drilling apparatus and therefore cause trouble when the apparatus is operated automatically continuously in the absence of the operator. Attempts are also made to cause drills to produce chips in the form of small fragments instead of forming continuous chips. Further to discharge chips smoothly, conventional drills are formed with enlarged flutes for curled chips to pass therethrough easily.

In the case where chips are thus discharged as curled, there arises the problem that the chips are cumbersome to remove. Especially, deep hole drilling encounters the problem that chips clog up the flute without being discharged smoothly to make it impossible to conduct the drilling operation.

Further when large flutes are formed to discharge chips smoothly, there arises the problem that the shank has reduced torsional rigidity, failing to drill holes efficiently.

Deep hole drilling, which involves the necessity of supplying oil to the cutting portion, encounters another problem. When the oil is supplied through the flute from outside, the chip moves up while curling to the shape of a funnel to scoop up the oil supplied to the flute, with the result that the oil fails to reach the cutting portion. To overcome this problem, conventional twist drills are produced by a complex method, i.e., by forming an axial bore in a shank, then twisting the shank and forming oil supply ports.

The main object of the present invention, which has been accomplished to eliminate these drawbacks of the prior art, is to provide a drill having shallow chip discharge flutes generally L-shaped in cross section, given improved rigidity and permitting chips to be discharged smoothly while being prevented from continuously curling without the necessity of forming the flutes to a greater depth even for use in deep hole drilling, the drill further being so adapted that the chips produced spontaneously breaks when egressing from the hole formed by the drill or When leaving the drill.

SUMMARY OF THE INVENTION

The present invention provides, as a first feature thereof, a drill having a shank formed with helical or straight flutes for discharging chips therethrough and a pair of cutting edges formed at one end of the shank and extending continuously from the center of rotation of the drill to the periphery thereof, the drill being characterized in that each of the flutes is defined by a wall which is positioned rearward with respect to the direction of rotation of the drill and against which a flat plate portion of the chip formed by the portion of the cutting edge on the peripheral side is to be pressed, and by a wall positioned forward with respect to the direction for a side edge portion of the chip to come into contact with, the forward wall being inclined with respect to the rearward wall so as to prevent the chip from curling in its entirety.

The invention further provides, as a second feature thereof, a drill having a shank formed with helical or straight flutes for discharging chips therethrough and a pair of cutting edges formed at one end of the shank and extending continuously from the center of rotation of the drill to the periphery thereof, the drill being characterized in that each of the flutes is approximately L-shaped in cross section and defined by a wall positioned forward with respect to the direction of rotation of the drill and a wall positioned rearward with respect to the direction at an angle of 70 to 120 degrees with the forward wall.

Preferably, the flutes have a depth 0.25 to 0.40 times the diameter of the drill. The forward wall defining the flute may be recessed so that the peripheral side of the flute is enlarged forward with respect to the direction of rotation.

The chip formed by the drill is prevented from curling by the flute defining walls. The portion of the chip toward the center is plastically deformed by being stretched by the outer portion of the chip, and the chip is continuously discharged in the form of a flat plate from the hole or bore formed. The chip is fractured by being bent by a centrifugal force and the upper end of the fluted portion. The chip is in the form of a continuous piece while passing through the flute and is therefore smoothly dischargeable without clogging the flute even when the drill is used for deep hole drilling.

Since the chip does not curl, oil can be readily supplied to the cutting portion through the flutes.

DESCRIPTION OF THE PREFERRED EMBODIMENTS

Figure 1:
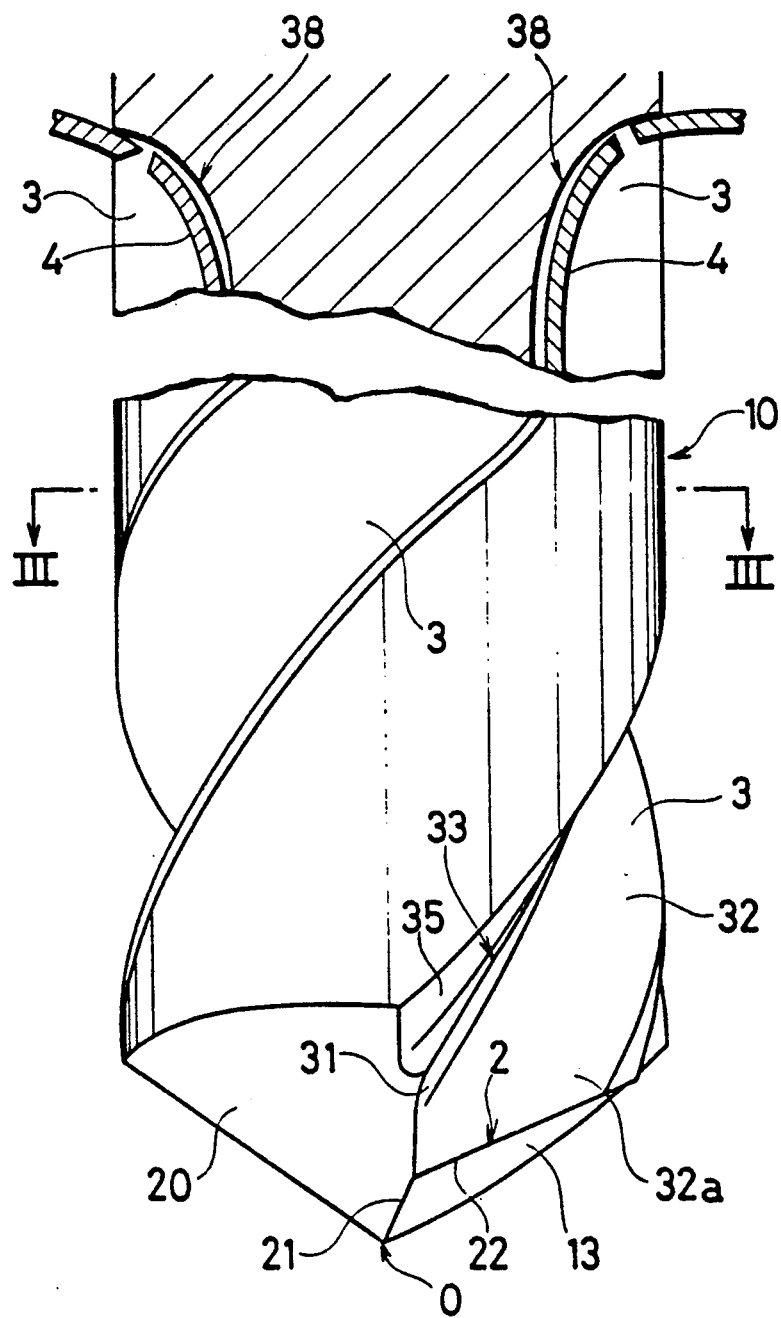
FIG. 1 is a side elevation partly broken away and showing a drill embodying the invention.
Figure 2:
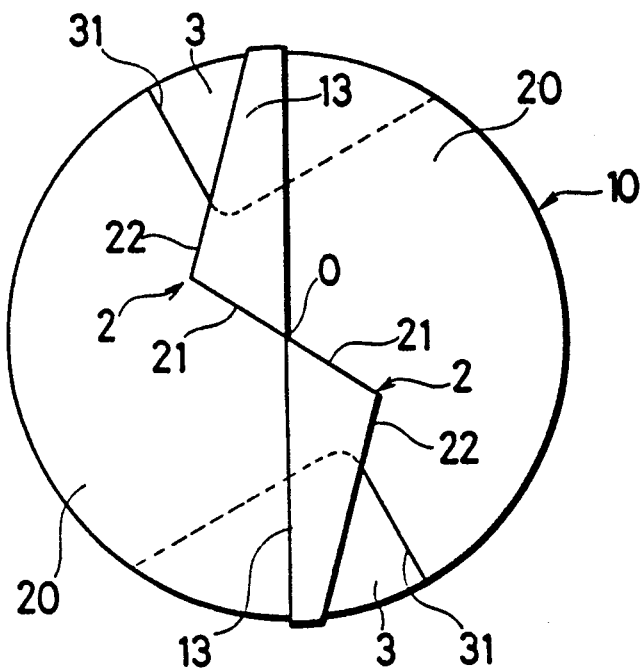
FIG. 2 is a bottom view of the same.
Figure 3:
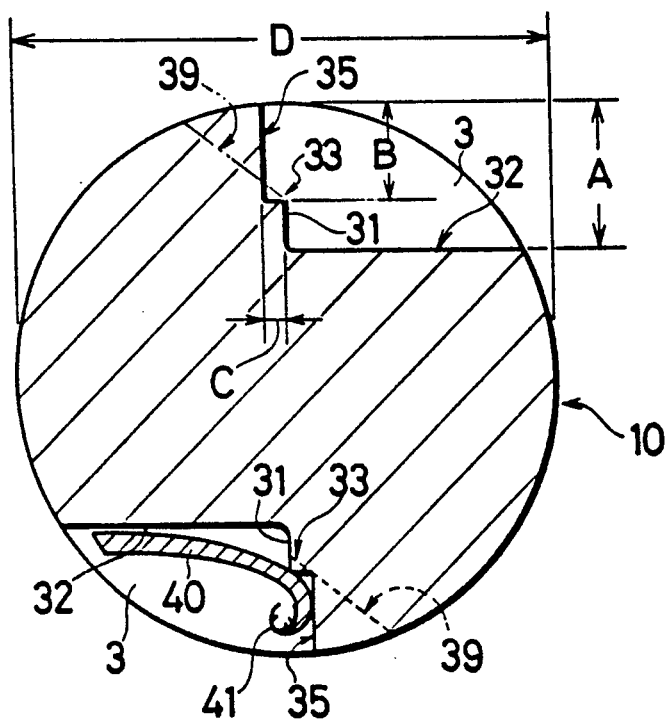
FIG. 3 is a view in section taken along the line III-III in FIG. 1.

With reference to FIGS. 1 to 3, the shank 10 of a drill has helical flutes 3 for discharging chips therethrough and a conical end, which is formed with a pair of cutting edges 2 arranged in point symmetry and extending from the center of rotation, O, of the drill to the outer periphery of the shank 10. Each of the cutting edges 2 comprises an edge portion 21 providing a chisel portion and an edge portion 22 extending from the portion 21 toward the periphery. These edge portions 21 and 22 are generally straight and in a V-shaped arrangement with an obtuse angle formed therebetween at the junction when seen in a bottom view. The edge portions 21, 22 may be curved forward or rearward with respect to the direction of rotation of the drill.

The end face of the shank 10 comprises a flank 13 having the cutting edge 2, and a land portion 20 in the form of a slanting surface and positioned in the rear of the flank 13 with respect to the direction of rotation.

Each of the flutes 3 is approximately L-shaped in cross section and defined by a wall 31 positioned forward with respect to the direction of rotation and a wall 32 positioned rearward with respect to the direction at an angle of 90 degrees with the wall 31. This angle is variable within the range of 70 to 120 degrees, preferably within the range of 85 to 100 degrees. If the angle is greater than this range, the chip will not be prevented from curling by being pressed against the flute defining wall as will be described later, whereas if the angle is smaller than the range, it is difficult to form the flute.

The forward wall 31 is recessed (by being cut away) so that the peripheral side of the flute 3 is enlarged forward with respect to the direction of rotation. More specifically, the forward wall 31 has a projection 33, and beyond this position toward the periphery, the wall 31 is recessed to provide a wall 35. Instead of forming the wall 35, a slanting wall 39 may be formed so as to increase the width of the flute toward the periphery. As shown in FIG. 1, the projection 33 continuously extends approximately centrally of the flute 3.

Preferably, the flutes 3 have a depth A 0.25 to 0.40 times the diameter D of the shank 10. If the depth A is smaller than this range, difficulty is encountered in discharging chips, whereas deeper flutes impair the rigidity of the shank 10. The depth A of the illustrated flutes is 0.25 times the diameter D of the drill. The peripheral enlarged portion of the flute 3 has a dimension B which is about 0.15 D and a dimension C which is about 0.1D.

Figure 4:
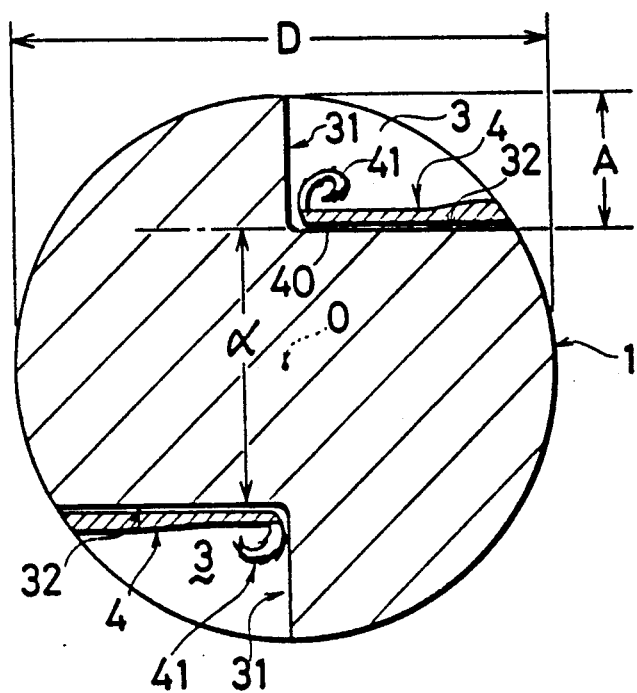
FIGS. 4 to 10 are views corresponding to FIG. 3 and showing different embodiments of the invention.

FIG. 4 shows another embodiment of the invention which has the same construction as above in that the flute 3 thereof is defined by walls 31 and 32 intersecting each other at a right angle but differs from the first embodiment in that the wall 31 has no projection 33 and extends to the periphery of the shank.

The walls 31 and 32 defining the flute 3 are each straight in cross section and make an angle of 90 degrees therebetween. However, these walls can be modified variously as shown in FIGS. 5 to 10.

Figure 5:
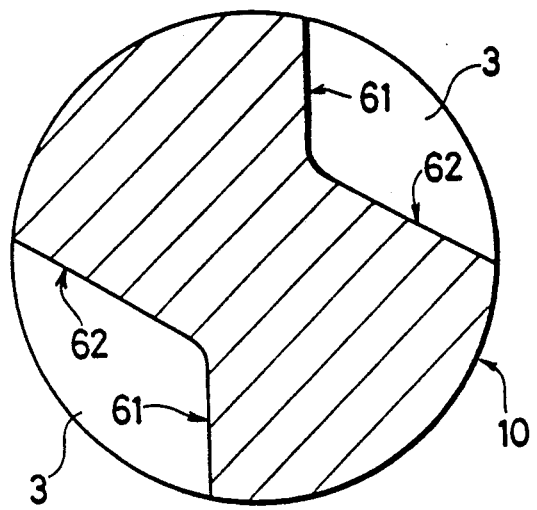
Figure 6:
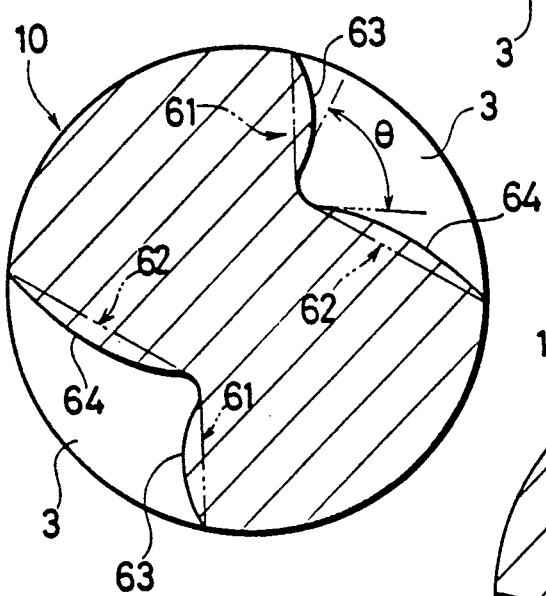
Figure 7:
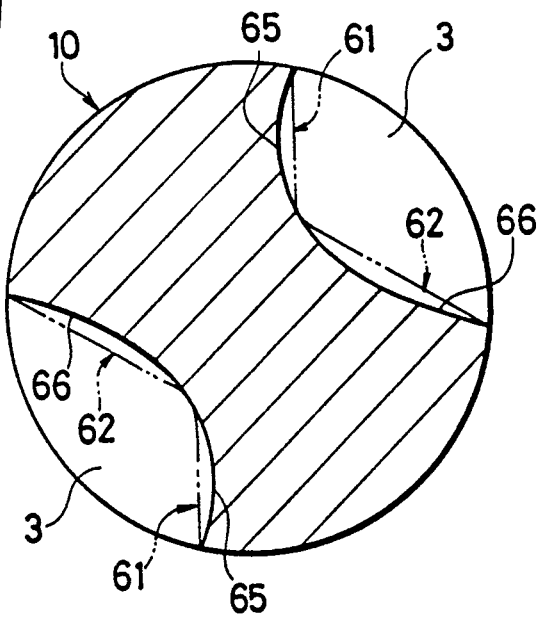

With reference to FIG. 5, a wall 61 forward with respect to the direction of rotation of the drill is at an angle of 120 degrees with a rearward wall 62. The walls 61, 62 are each straight in cross section. FIG. 6 shows walls 63 and 54 which, unlike the walls 61 and 62, are curved inward (toward the flute 3). The substantial angle $\theta$ between the two ralls in the vicinity of their intersection is small. FIG. 7 shows walls 65 and 66 which are curved outward unlike the straight walls 61 and 62.

Although not shown, the flute may be defined by the combination of the walls 61, 64, the walls 61, 66, the walls 63, 62, the walls 63, 66, the walls 65, 62, or the walls 65, 64.

Figure 8:
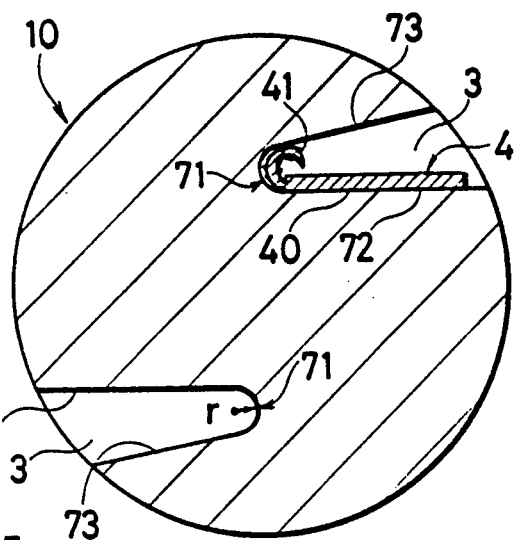

FIG. 8 shows a U-shaped flute 3 of reduced width defined by a straight wall 72 positioned rearward with respect to the direction of rotation and a wall forward with respect to the direction. The forward wall comprises a curved wall 71 in the vicinity of its inner end and a wall 73 extending from the wall 71 straight outward. In this case, the size of the flute 3 and the curvature r of the wall 71 are so determined that chips 4 can be smoothly formed free of trouble as seen in FIG. 8. The curvature is, for example, about 1/10 of the diameter D of the drill or greater.

Figure 9:
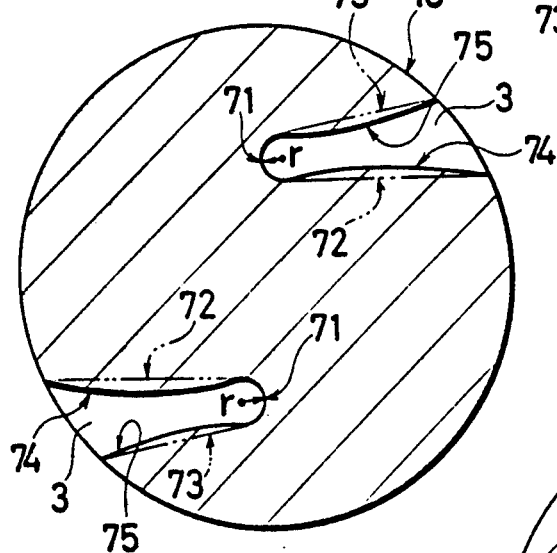
Figure 10:
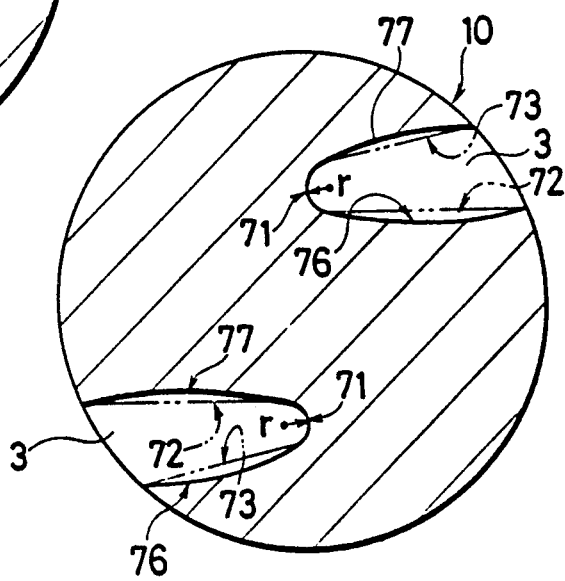

FIG. 9 shows walls 74 and 75 which are curved inward (toward the flute 3) unlike the walls 72 and 73. FIG. 10 shows outwardly curved walls 76 and 77 in place of the straight walls 72 and 73.

The flute may be defined by the combination of the walls 72 and 75, the walls 72, 77, the walls 73, 74, the walls 73, 76, the walls 75, 76, or the walls 74, 77.

Figure 11:
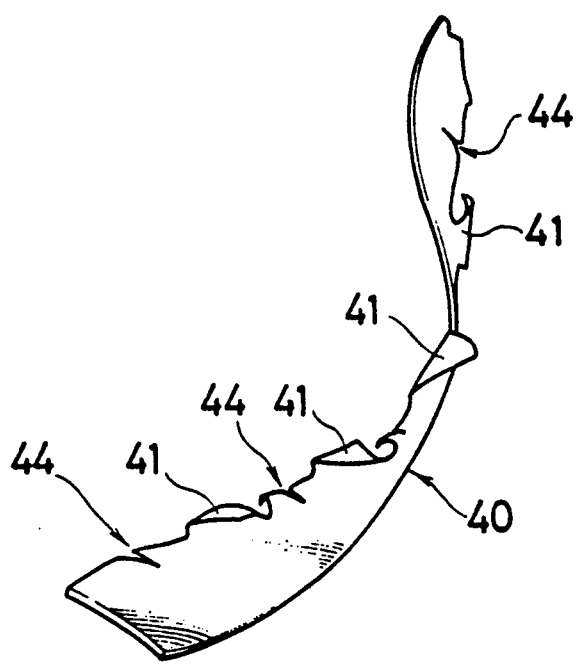
FIG. 11 is a perspective view of a chip formed by the drill.

When the drill is used for forming a hole or bore, chips 4 as shown in FIG. 11 are produced. The chip 4 comprises small curl portions 41 formed by the portion of the cutting edge 2 close to the center of the drill, and a flat plate portion 40 formed by the other portion of the edge 2 toward the drill periphery. The curl portions 41 extend from one side of the plate portion integrally therewith and are arranged discretely longitudinally of the plate portion 40, with cracks 44 formed in the side part.

The chip 4 thus shaped is produced in the following manner. With reference to FIG. 4, the flat plate portion 40 formed by the outer portion (edge portion 22) of the cutting edge 2 and forced into the flute 3 has its one side pressed against the base portion of the wall 31, with the planar part of the plate portion 40 pressed against the wall 32, whereby the chip 4 is prevented from curling in its entirety. The chip is subjected to plastic deformation by the cutting action and further plastically deformed by being stretched by its outer portion. Consequently, the chip in the form of a flat strip with cracks 44 formed in the side part thereof is forced upward through the flute 3. The chip thus moving upward along the gentle helical shape of the flute 3 egresses from the drilled bore and fractured at the cracked portions 44 by a centrifugal force. When the bore drilled is deep, the chip is bent outward by a curved fluted portion 38 at the upper end of the flute as seen in FIG. 1, with the result that the chip 4 made brittle by cracking and marked plastic deformation is broken into fragments.

The chip 4 formed by the drill of the construction shown in FIGS. 1 to 3 is forced upward into the flute 3 with the flat plate portion 40 initially pressed by the rake face 32a and with the side part pressed against the wall 31. The side outer portion of the chip 4 then moves to the enlarged flute portion defined by the wall 35 as seen in FIG. 3. This assures smooth discharge of the chip 4. While the wall 31 acts to prevent the chip from curling by pressing contact with the side part of the flat plate portion 40, the enlarged flute portion provided by the wall 35 positioned outward from the wall 31 thus facilitates passage of the chip. Especially when the drill is used for deep hole drilling, the drill exhibits the advantage of smoothly discharging chips 4.

With the structure shown in FIG. 5, the chip 4 has its flat plate portion 40 pressed against the wall 62, with one edge thereof in contact with the base portion of the wall 61, whereby the chip 4 in the flute 3 is prevented from curling in its entirety before discharge. With the construction of FIG. 8, the chip 4 has its flat plate portion 40 pressed against the wall 72, with one edge thereof in contact with the wall 71, whereby the chip in the flute is prevented from curling before discharge. The embodiments of FIGS. 6 and 7, and those of FIGS. 9 and 10 have the same advantage as the respective embodiments of FIGS. 5 and 8.

According to the invention described above, the chip 4 can be discharged in the form of a flat strip without curling in its entirety within the flute 3, so that the flute 3 need not have a large depth. This increases the core thickness (the dimension between the deepest portions of the flutes) $\alpha$ (see FIG. 4) of the shank 10 to thereby give improved rigidity to the shank, consequently precluding the axis of the drill from deflecting during drilling.

The embodiments described above are free of the likelihood that the chip to be discharged will not scoop up the oil supplied to the flute. This makes it possible to supply oil through the flute from outside and therefore results in the advantage that an oil supply opening need not be formed in the drill.

Although the flutes 3 formed in the shanks of the foregoing embodiments are all helical, such flutes need not always be helical but can be straight.

With the present invention described above, the chip is prevented from curling and plastically deformed by the flute defining walls, continuously discharged in the form of a flat plate and fractured by a centrifugal force when projecting from the drilled hole by a predetermined amount. Further when the drilled bore is deep, the chip is bent outward at the upper end of the flute and thereby fractured. The chip extends continuously through the flute and can therefore be discharged smoothly without clogging the flute even during deep hole drilling.

The reduced depth of the flute gives improved rigidity to the shank, consequently rendering the drill operable with a high efficiency and high accuracy even for deep hole drilling and easily usable at a high feed speed. Since oil can be supplied through the flute from outside, the drill has the advantage that there is no need to form an oil supply opening in the drill.

What is claimed is:

1. A drill comprising:
   a shank formed with flutes for discharging chips therethrough;
   a pair of cutting edges formed at one end of said shank, said cutting edges including an inner edge portion extending from the center of rotation of the drill to an intermediate point and an outer edge portion extending from said intermediate point to the periphery of the drill, said inner edge portion and said outer edge portion being continuous;
   said flutes being approximately L-shaped in cross section and being defined by a forward wall positioned forward with respect to the direction of rotation of the drill and a rearward wall positioned rearward with respect to the direction of rotation of the drill, said rearward wall being disposed generally at an angle of 85° to 100° relative to said forward wall such that said forward wall substantially prevents the produced chips from curling, said forward wall having an inner portion and an outer portion, said inner portion being disposed radially inwardly of said outer portion, said outer portion being positioned forwardly of said inner portion with respect to the direction of rotation of the drill, said flute having a radial depth in cross section of 0.25 to 0.40 times the diameter of the drill.

2. A drill according to claim 1, wherein said inner and outer portions are parallel to each other.

3. A drill according to claim 1, wherein said inner portion is spaced from said outer portion, said forward wall having an intermediate portion connecting said spaced inner and outer portions.

4. A drill according to claim 2, wherein said forward wall further has an intermediate portion connecting said inner and outer portions, said intermediate portion extending generally perpendicular to said inner and outer portions.

5. A drill comprising:
   a shank formed with flutes for discharging chips therethrough;
   a pair of cutting edges formed at one end of said shank, said cutting edges including an inner edge portion extending from the center of rotation of the drill to an intermediate point and an outer edge portion extending from said intermediate point to the periphery of the drill, said inner edge portion and said outer edge portion being continuous;
   said flutes being approximately L-shaped in cross section and being defined by a forward wall positioned forward with respect to the direction of rotation of the drill and a rearward wall positioned rearward with respect to the direction of rotation of the drill, said forward wall being disposed along a radial line of said drill, said rearward wall being disposed generally at an angle of 85° to 100° relative to said forward wall such that said forward wall substantially prevents the produced chips from curling, said flute having a radial depth in cross section of 0.25 to 0.40 times the diameter of the drill.

* * * * *